US009475596B2

(12) United States Patent
Fux

(10) Patent No.: US 9,475,596 B2
(45) Date of Patent: Oct. 25, 2016

(54) METHOD FOR DOSING BULK MATERIAL

(75) Inventor: Erhard Fux, Vienna (AT)

(73) Assignee: WITTMAN KUNSTSTOFFGERAETE GMBH, Vienna (AT)

( * ) Notice: Subject to any disclaimer, the term of this patent is extended or adjusted under 35 U.S.C. 154(b) by 583 days.

(21) Appl. No.: 13/984,390

(22) PCT Filed: Feb. 7, 2012

(86) PCT No.: PCT/AT2012/000021
§ 371 (c)(1),
(2), (4) Date: Aug. 8, 2013

(87) PCT Pub. No.: WO2012/106740
PCT Pub. Date: Aug. 16, 2012

(65) Prior Publication Data
US 2013/0319574 A1    Dec. 5, 2013

(30) Foreign Application Priority Data
Feb. 9, 2011   (AT) .................................. A 174/2011

(51) Int. Cl.
B01F 15/02       (2006.01)
B65B 1/32        (2006.01)
(Continued)

(52) U.S. Cl.
CPC ................. B65B 1/32 (2013.01); B01F 3/184 (2013.01); B01F 15/0445 (2013.01); G01G 13/02 (2013.01); B29C 45/18 (2013.01)

(58) Field of Classification Search
CPC .... B01F 3/184; B01F 13/02; B01F 15/0445; B65B 1/32; B29C 45/18
USPC ........................... 366/76.9–76.93, 141, 183.1
See application file for complete search history.

(56) References Cited

U.S. PATENT DOCUMENTS 3,822,866 A     7/1974  Daester et al.
5,110,521 A  *  5/1992  Moller ............. B01F 15/00428
                                                    222/55

(Continued)

FOREIGN PATENT DOCUMENTS

DE    295 15 725 U1    5/1996
DE    195 28 636 A1    2/1997
(Continued)

OTHER PUBLICATIONS

Austrian Search report from related Austrian Patent Appl. No. A174/2011, mail date is Dec. 29, 2011.
(Continued)

Primary Examiner — Charles Cooley
(74) Attorney, Agent, or Firm — Greenblum & Bernstein, P.L.C.

(57) ABSTRACT

The invention relates to a method and a device for dosing bulk material, in particular plastic granulate, for machines processing plastic granulate, in particular for injection molding machines. Different amounts of different plastic granulates are filled in batches according to freely adjustable formulas and each individual type of a plastic granulate, such as for example virgin material, masterbatch, additives and/or material to be ground, is successively released into a weighing container from a material hopper (2) via a material valve. Weighing occurs in the weighing container (4) and the formula amount is subsequently blended into a mixer. The amount of plastic granulate, preferably the virgin material and/or material to be ground, disproportionately high for the formula is filled into the weighing container (4) from at least two material hoppers (2) by means of a parallel filling or multiple parallel filling.

17 Claims, 2 Drawing Sheets

(51) Int. Cl.
    *B01F 3/18*         (2006.01)
    *B01F 15/04*      (2006.01)
    *G01G 13/02*      (2006.01)
    *B29C 45/18*      (2006.01)

(56) References Cited

U.S. PATENT DOCUMENTS

| | | | | |
|---|---|---|---|---|
| 5,148,943 | A * | 9/1992 | Moller | B01F 15/0251 177/50 |
| 5,599,099 | A * | 2/1997 | Bullivant | B01F 15/0202 366/141 |
| 6,007,236 | A | 12/1999 | Maguire | |
| 6,057,514 | A * | 5/2000 | Maguire | G01G 13/026 177/105 |
| 6,155,709 | A * | 12/2000 | O'Callaghan | B01F 15/0445 366/141 |
| 6,203,184 | B1 * | 3/2001 | O'Callaghan | B01F 7/088 366/141 |
| 6,402,363 | B1 | 6/2002 | Maguire | |
| 8,307,986 | B2 | 11/2012 | Fux | |
| 8,562,204 | B2 | 10/2013 | Konermann | |
| 2003/0024955 | A1 * | 2/2003 | Maguire | B01F 3/18 222/559 |
| 2003/0185095 | A1 * | 10/2003 | Moretto | B01F 5/241 366/141 |
| 2008/0049546 | A1 * | 2/2008 | O'Callaghan | B01F 3/18 366/132 |
| 2008/0267004 | A1 * | 10/2008 | Deters | B01F 3/18 366/141 |
| 2010/0220546 | A1 | 9/2010 | Konermann | |
| 2010/0312503 | A1 * | 12/2010 | Fux | B65G 53/66 702/55 |
| 2013/0319574 | A1 * | 12/2013 | Fux | B01F 3/184 141/1 |
| 2015/0217878 | A1 * | 8/2015 | Fux | B01F 15/0445 141/83 |

FOREIGN PATENT DOCUMENTS

| | | | |
|---|---|---|---|
| DE | 696 27 717 T2 | 1/2004 | |
| DE | 697 32 659 T2 | 12/2005 | |
| DE | 05 075 472 T1 | 3/2006 | |
| DE | 10 2007 050 268 A1 | 4/2009 | |
| EP | 0507689 A2 * | 10/1992 | B01F 15/0445 |
| FR | 2 746 917 A1 | 10/1997 | |

OTHER PUBLICATIONS

Preliminary Report on Patentability from related International Appl. No. PCT/AT2012/000021, mail date is Jun. 25, 2013.

* cited by examiner

METHOD FOR DOSING BULK MATERIAL

CROSS-REFERENCE TO RELATED APPLICATIONS

The present application is a U.S. National Stage of International Patent Application No. PCT/AT2012/000021 filed Feb. 7, 2012 and claims priority under 35 U.S.C. §§365 and 119 of Austrian Patent Application No. A 174/2011 filed Feb. 9, 2011.

BACKGROUND OF THE INVENTION

1. Field of the Invention

The invention relates to a method for dosing bulk material, in particular plastic granulate, for machines processing plastic granulate, in particular for injection molding machines, wherein different amounts of different plastic granulates are filled in batches according to freely adjustable formulas and each individual type of a plastic granulate, such as for example virgin material, masterbatch, additives and/or material to be ground, is successively released into a weighing container from a material hopper via a material valve, weighed in the weighing container and the formula amount subsequently blended into a mixer.

2. Discussion of Background Information

A sequence of the above-illustrated process steps is customary today in the pertinent industry.

Furthermore, a method and a gravimetric mixer for dispensing measured amounts of granular materials and colorants, in particular pigments in liquid form, is known from DE 696 27 717 T2.

Moreover, a gravimetric mixer and filling hopper with integrated dispensing valve for granular material is known from DE 05 075 472 T1.

Furthermore, from DE 697 32 659 T2 a gravimetric mixer is known which includes a frame, a removable material supply hopper with a valve, a weighing container with weight measurement, and a mixing chamber below the weighing container.

As already illustrated at the outset, different amounts of different plastic granulates are filled in batches according to freely adjustable formulas, and each individual type of a plastic granulate, such as for example virgin material, masterbatch, additives and/or material to be ground, is successively released into a weighing container from a material hopper via a material valve.

In most cases, a formula is used which contains the individual types of the plastic granulates, such as for example virgin material, material to be ground, masterbatch and/or additives. Virgin material and material to be ground are thereby disproportionate to masterbatch and additive in terms of weight. Thus, the proportions of virgin material and material to be ground can be approximately 70% and 30%, and masterbatch or additive 1%-2% with regard to the virgin material. A separate container is provided for each type of the plastic granulates.

SUMMARY OF THE EMBODIMENTS

The invention therefore creates a method of the type named at the outset which leads to economizations in terms of time.

The invention provides a device for performing the above method.

The method according to the invention is characterized in that an amount of plastic granulate disproportionately high for the formula, preferably a virgin material and/or material to be ground, is filled into a weighing container from at least two material hoppers by a parallel filling or multiple parallel filling. With the invention, it is possible for the first time to increase the throughput for the types of the plastic granulates that are used in an disproportionately high manner according to the formula. In this manner, the batch combination occurs in the shortest time.

An additional advantage of the parallel filling and multiple parallel filling is that, because of a bridging of the plastic granulate during the filling from a material hopper, there are no more interruptions of operation, since the filling of course at least occurs from the second material hopper.

According to a particular feature of the invention, the amount of plastic granulate is continuously weighed during the filling. An exact dosing of all batches is hereby achieved, so that overdosings of expensive types of plastic granulate are avoided. These exact dosings lead to a cost-related and qualitative optimization of the material throughput for the product requirement. A calculation of the statistical average for achieving the target weight, the so-called "hunting" known from the prior art, is not used.

According to a particular embodiment of the invention, the parallel filling or the multiple parallel filling is stopped shortly before achieving a target amount, preferably at approximately 95% of the target amount. A controlled precision dosing can thereby occur up to the target amount. An overdosing is also avoided by this process step.

According to a further particular feature of the invention, another type of plastic granulate, for example, an additive and/or a masterbatch, is dosed into the weighing container following completion of the parallel filling or multiple parallel filling and, based on this actually measured-out amount, the target amount of the parallel filling or multiple parallel filling of plastic granulate amount is determined and filled into the weighing container. This innovative process step also avoids an overdosing. Following completion of the parallel filling or multiple parallel filling, the formula amount of additive, for example, is dosed into the weighing container. Based on the amount of additive now actually weighed, the target amount of the parallel filling or the multiple parallel filling is extrapolated and filled in a correspondingly precision-dosed manner. The batch combination thus always corresponds to the exact formula and therefore ensures a uniformly high quality of the end product.

According to a very particular feature of the invention, the filling of the weighing container only occurs from one material hopper via a material valve to achieve the target amount of the parallel filling. This process step constitutes the precision dosing for achieving the exact target amount.

Moreover, the invention creates a device for carrying out the method, which device still further supports the more economical method by better efficiency, in particular with the smallest footprint of the device.

In the device for carrying out the method, a material hopper with a material valve is provided for each type of a plastic granulate, and a weighing container connected to a scale is arranged below the material valve and a mixer is arranged below the weighing container. A control is provided for the scale and the material valves. The device according to the invention is characterized in that, for an amount of plastic granulate disproportionately high according to the formula, preferably a virgin material and/or a material to be ground, at least two material hoppers are provided and each material hopper has a material valve embodied as a dosing valve. A platform load cell is provided as a scale and a ball mixer is provided as a mixer. With this invention, it is possible for the first time to markedly increase the material throughput for the disproportionately high amounts. Because the material valves are of course designed accordingly for the precision dosing, the throughputs cannot be arbitrarily increased. Thus, the filling time for this type of the plastic granulate is markedly reduced by a parallel filling or in particular multiple parallel filling of the material concerned. However, a reduction of this filling time also means, in the sequence of the chronological process steps, a significant economization of the procedure of the material feeding, that is, of the material storage, up to the machine, preferably the injection molding machine. Of course, a modular design can be chosen in an advantageous manner.

An additional benefit of this device according to the invention can be seen in the dosing valve. Quick-acting, wear-resistant valves of this type made of stainless steel also allow an efficient dosing of materials with a high proportion of fiberglass. Main materials and additives are accurately dosed to the desired amount.

The advantageous arrangement of a platform load cell, which is formed from two weighing cells independent of one another, produces a precise weighing signal that contributes to increasing the quality.

The round shape of a highly efficient ball mixer ensures an optimal mixing of the batch. The ball mixer has no dead corners and no residues result during emptying. It guarantees a homogeneous blending of the material.

One of the priority demands of the customer is always a most minimal design of the device, that is, a small footprint of the device, with a highest possible throughput of the device during operation. The small footprint is demanded because the device may be supposed to be arranged on the machine, preferably the injection molding machine, as a thin body. Decisive for the throughput is the transitional surface from material hopper and dosing valve to the weighing container. However, because of the small footprint demanded, this transitional surface is also only limited. The transitional surface integrates all openings of the different material hoppers into the weighing container. Thus, if the over-proportionate plastic granulate is only filled from one material hopper, the throughput is consequently limited. The innovative inventive concept thus consists in that an increase of the throughput, at a most minimal design of the device, is possible for the first time when two or more openings are used for the throughput.

According to an embodiment of the invention, the dosing valve is embodied as a self-closing material valve opening via a pneumatic cylinder, which cylinder is preferably arranged on the housing. By this innovative design of a pulsing flap valve as a dosing valve, the possibility exists of equipping all material hoppers, that is, the material hoppers for virgin material, material to be ground, and additives, with a highly precise valve type. Of course, the benefit is also brought to bear here that uniform components increase the efficiency and ensure the flexibility for the utilization of capacity.

According to a particular feature of the invention, the control includes a computer unit, in particular a microprocessor, to which the measured value of the platform load cell is fed, and the computer unit in which the formula is stored computes the amount of the individual types of the plastic granulates and controls the dosing valves accordingly. By a proprietary adaptive regulating algorithm, a precise dosing is achieved using the control. Of course, with this control a most simple operation is a basic requirement and therefore a high performance is achieved. Furthermore, the Real Time Live Scale (RTLS) technology ensures a two-stage, progressively more accurate dosing for an exact target weight. It does not need to be mentioned that this control has network capability with mainframes, laptops, and the like. The control unit itself consists of electric standard components that ensure a dependable operation and a simple maintenance.

The invention is explained in greater detail by an exemplary embodiment illustrated in the drawing.

BRIEF DESCRIPTION OF THE DRAWINGS

The following show.

DETAILED DESCRIPTION OF THE EMBODIMENTS

Figure 1:
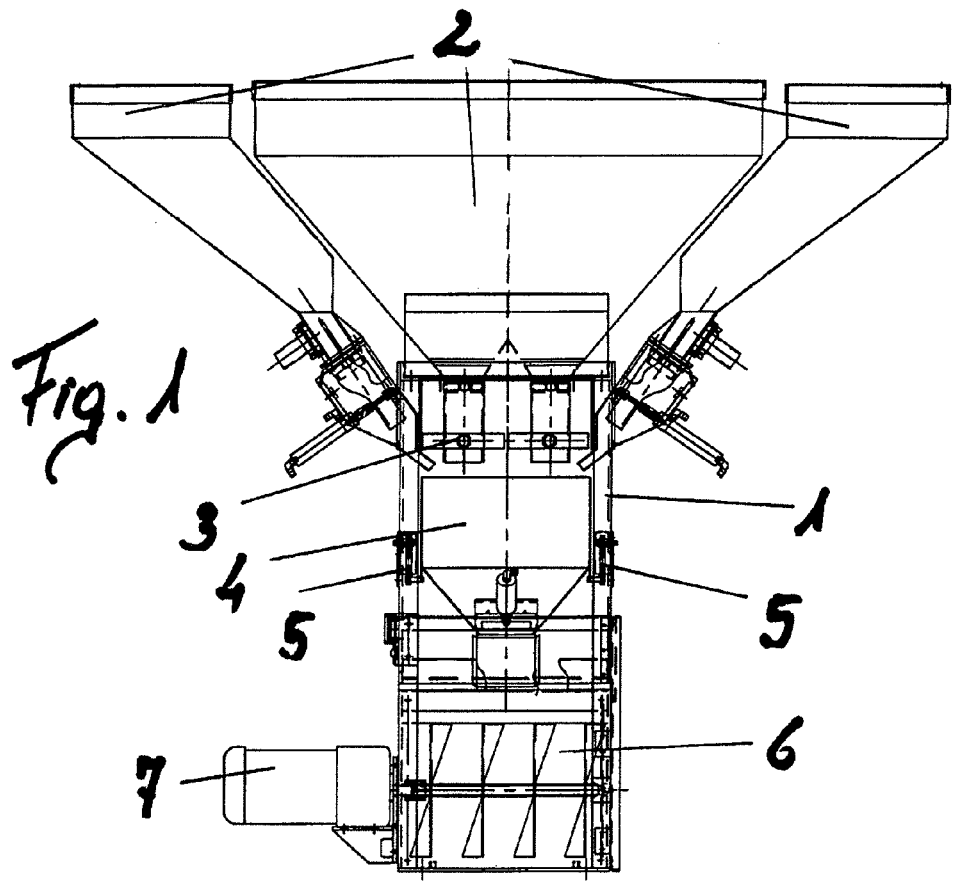
FIG. 1 a cross section through the device.

The device for dosing bulk material, in particular plastic granulate, for machines processing plastic granulate, in particular for injection molding machines, is modularly constructed and includes a housing 1, in which the installations described below in still greater detail are arranged, and of removable material hoppers 2. For each type of a plastic granulate, a material hopper 2 with a dosing valve 3 is provided. The material hoppers 2 are, on the one hand, closeable via removable material hopper covers and, on the other hand, have in the covered state a mounting flange for the feed of plastic granulate. For easier handling, each material hopper 2 can have two handles. For more comfortable cleaning and also for visual inspection, each material hopper 2 can have a removable observation window. Furthermore, the material hopper 2 can be made of wear-resistant stainless steel and have quick-release fasteners for the rapid removal of the material hoppers 2 from the housing 1.

A weighing container 4 connected to a scale is arranged below the dosing valve 3 and a mixer is arranged below the weighing container 4. A platform load cell 5 is provided as a scale and a ball mixer 6 is provided as a mixer. The platform load cell 5 is connected to the dosing valve 3 via a control (not illustrated).

The dosing valve 3 is embodied as a self-closing dosing valve 3. The opening of the dosing valve 3 occurs via a pneumatic cylinder preferably arranged on the housing 1.

The platform load cell 5 includes two weighing cells independent of one another which deliver an extremely precise weighing measurement. The weighing container 4 rests on guides of the weighing cells and has a large material outlet angle for a complete emptying.

The highly efficient ball mixer 6 has a round shape, without dead corners, for an optimal mixing and is driven by an electric motor 7.

In the dosing device illustrated above, different amounts of different plastic granulates are filled in batches according to freely adjustable formulas. Each individual type of a plastic granulate, such as for example virgin material, masterbatch, additives and/or material to be ground, is successively released into the weighing container 4 from a material hopper 2 via a dosing valve 3, weighed in the weighing container 4, and the formula amount is subsequently blended in the ball mixer 6. At least two material hoppers 2 are provided for the amounts of plastic granulate disproportionately high according to the invention, preferably for the virgin material and/or the material to be ground.

Figure 2:
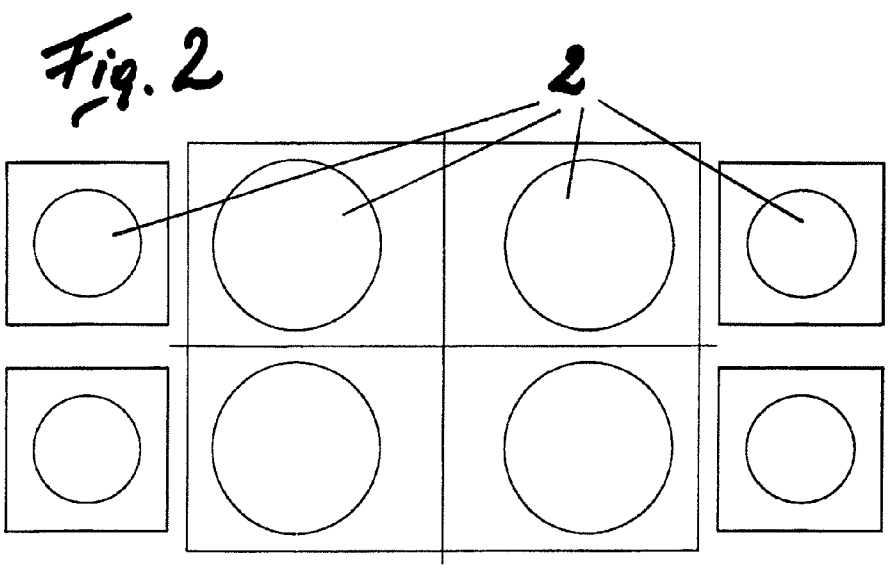
FIG. 2 a top view of the device according to FIG. 1.

According to FIG. 2, which shows a top view of the dosing device according to FIG. 1, several material hoppers 2 are provided on the housing 1. As mentioned previously, at least two material hoppers 2 are provided for the disproportionately high amounts of the formula of plastic granulate, preferably for the virgin material and/or the material to be ground. These disproportionately high amounts of plastic granulate, preferably the virgin material and/or material to be ground, are hereby filled into the weighing container 4 from at least two material hoppers 2 by a parallel filling or multiple parallel filling. The throughput for these types of the plastic granulates is increased immensely, whereby the batch combination occurs in the shortest time.

As mentioned previously, the amounts of virgin material and material to be ground are mostly disproportionate to the amounts of masterbatch and additive in terms of weight. Thus, the proportions of virgin material and material to be ground can be approximately 70% and 30%, and masterbatch or additive 1%-2% with regard to the virgin material. Because of this fact, high economizations are ensured by the parallel filling or multiple filling.

As mentioned previously, the platform load cell 5 is connected to the dosing valves 3 via a control or regulation. The control includes a computer unit, in particular a microprocessor, to which the measured value of the platform load cell 5 is fed. The formula is stored in the computer unit, and the control accordingly controls the dosing valves 3 and fills the amount of the individual types of the plastic granulates.

The method for dosing bulk materials, in particular plastic granulate, for machines processing plastic granulate, in particular for injection molding machines, occurs in the manner such that different amounts of different plastic granulates are filled according to freely adjustable formulas. The amounts of plastic granulate disproportionately high for the formula, preferably the virgin material and/or material to be ground, are thereby filled into the weighing container 4 from at least two material hoppers 2 by a parallel filling or multiple parallel filling. Each individual type of a plastic granulate, such as for example virgin material, masterbatch, additives and/or material to be ground, is successively released into a weighing container 4 from the material hopper 2 via the dosing valve 3, weighed in the weighing container 4, and the formula amount is subsequently blended into a ball mixer 6. The amount is continuously weighed during the filling. The parallel filling or the multiple parallel filling is stopped shortly before achieving the target amount, preferably at approximately 95% of the target amount.

Following completion of the parallel filling or multiple parallel filling, another type of a plastic granulate, for example the additive and/or the masterbatch, is dosed into the weighing container 4 and, based on this actually measured-out amount, the target amount of the parallel filling or multiple parallel filling of plastic granulate amount is determined and filled into the weighing container 4. To achieve the target amount of the parallel filling, the filling of the weighing container 4 only occurs from one material hopper 2 via the dosing valve 3.

Figure 3:
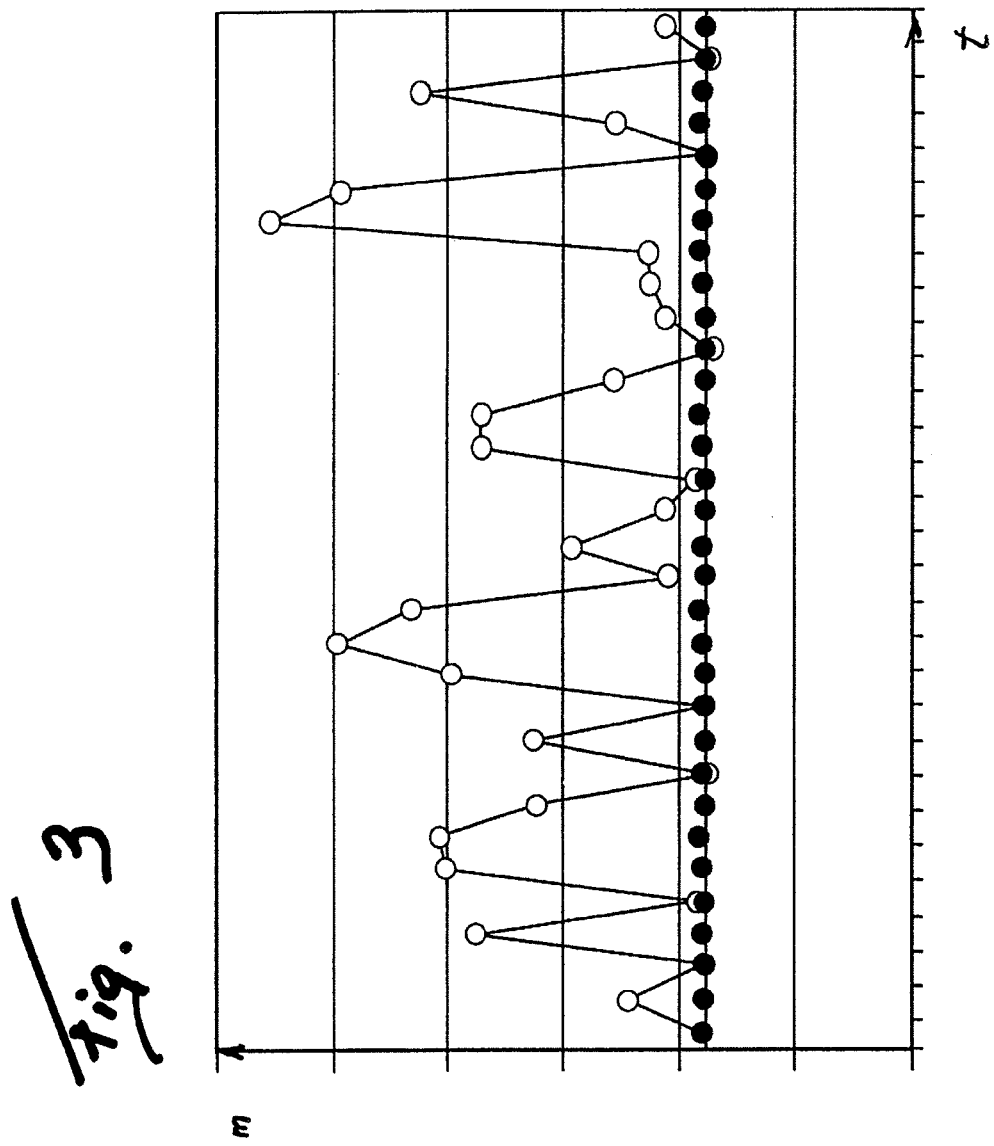
FIG. 3 a chart.

As illustrated previously, it is also one of the considerable benefits of this method that an overdosing is avoided. According to FIG. 3, a chart is shown in which the amount (m) of dosed bulk material (in percent) is indicated for individual batches of the bulk material supplied over time (t). The curve with the white circles shows the prior art, which results from "hunting" or statistical, possibly time-based calculation of an average, and the curve with the black circles shows fillings using exact dosing according to the method described above.

In the method discussed, a precise dosing is achieved using the control by the regulating algorithm. Furthermore, the RTLS technology ensures a two-stage, progressively more accurate dosing for an exact target weight.

The invention claimed is:

1. Method for dosing bulk material for machines processing plastic granulate wherein different amounts of different plastic granulates are filled in batches according to freely adjustable formulas and each individual type of a plastic granulate is successively released into a weighing container from material hoppers via one material valve each, weighed in the weighing container, and the formula amount subsequently blended into a mixer, wherein the amount of plastic granulate disproportionately high for the formula is filled into the weighing container from at least two material hoppers by a parallel filling or multiple parallel filling, wherein the parallel filling or the multiple parallel filling is stopped shortly before achieving the target amount and in that the filling of the weighing container only occurs from one material hopper via a material valve to achieve the target amount of the parallel filling.

2. Method according to claim 1, wherein the amount is continuously weighed during the filling.

3. Method according to claim 1, wherein another type of a plastic granulate is dosed into the weighing container following completion of the parallel filling or multiple parallel filling and, based on this actually measured-out amount, the target amount of the parallel filling or multiple parallel filling of plastic granulate amount is determined and filled into the weighing container.

4. Method according to claim 3, wherein the another type of the plastic granulate comprises at least one of an additive and/or a masterbatch.

5. Device for carrying out the method according to claim 1, the material hoppers comprise at least one material hopper with a material valve provided for each individual type of a plastic granulate and the weighing container is connected to a scale arranged below the material valves and the mixer is arranged below the weighing container,
wherein a control is provided for the scale and the material valves, wherein each material valve is a dosing valve embodied as a self-closing material valve opening via a pneumatic cylinder, and wherein the scale comprises a platform load cell and the mixer comprises a ball mixer.

6. Device according to claim 5, wherein the control includes a computer unit to which the measured value of the platform load cell is fed and the computer unit in which the formula is stored computes the amount of the individual types of the plastic granulates and controls the dosing valves accordingly.

7. Device according to claim 5, wherein the pneumatic cylinder is arranged on the housing.

8. Method according to claim 1, wherein the bulk material comprises plastic granulate and the machine for processing plastic granulate comprises an injection molding machine.

9. Method according to claim 1, each individual type of plastic granulate comprises at least one of virgin material, masterbatch, additives and/or material to be ground.

10. Method according to claim 1, the plastic granulate in an amount disproportionately high for the formula comprises at least one of virgin material and/or material to be ground.

11. Method according to claim 1, wherein stopping of the parallel filling or the multiple parallel filling shortly before achieving the target amount comprises stopping the parallel filling or the multiple parallel filing at approximately 95% of the target amount.

12. Device according to claim 1, wherein the computer unit comprises a microprocessor.

13. A method for dosing plastic granulate material for machines processing plastic granulates, the plastic granulate material comprising different types of plastic granulates supplied in batches according to freely adjustable formulas, the method comprising:
- successively releasing from respective material hoppers each of the different types of plastic granulates into a weighing container according to formula amounts, wherein each material hopper has one material valve through which the type of plastic granulate in the respective material hopper is released;
- weighing each the successively released different types of plastic granulate in the weighing container until the formula amounts are attained; and
- blending the weighed successively released different types of plastic granulate bulk material in a mixer,
- wherein when an amount of one type of plastic granulate according to the formula amounts is disproportionately high in relation to another type of plastic granulate, the one type of plastic granulate is released into the weighing container from at least two of the material hoppers containing the one type of plastic granulate via a parallel filling or multiple parallel filling operation;
- wherein, when releasing the one type of plastic granulate via the parallel filling or the multiple parallel filling operation, the releasing is stopped before a target amount for the one type of plastic granulate according to the formula amount is attained and a remaining amount of the one type of plastic granulate to attain the target amount is released into the weighing container from only one of the at least two of the material hoppers containing the one type of plastic granulate.

14. Method according to claim 13, wherein the different types of plastic granulate comprises at least one of virgin material, masterbatch, additives and/or material to be ground.

15. Method according to claim 13, the one type of plastic granulate according to the formula amounts that is disproportionately high in relation to another type of plastic granulate comprises at least one of virgin material and/or material to be ground.

16. Method according to claim 15, wherein the another type of plastic granulate comprises at least one of an additive and/or a masterbatch.

17. Method according to claim 13, wherein the releasing of the one type of plastic granulate according to the formula amount via the parallel filling or the multiple parallel filling operation is stopped when 95% of the target amount is attained.

* * * * *